United States Patent [15] 3,662,122

Grundtner et al. [45] May 9, 1972

[54] WIDE-RECORD NARROW-READ LAMINATED MAGNETIC HEAD

[72] Inventors: Matthias J. Grundtner, St Paul; George E. Melink, Burnsville, both of Minn.

[73] Assignee: Sperry Rand Corporation, New York, N.Y.

[22] Filed: Dec. 4, 1969

[21] Appl. No.: 882,252

[52] U.S. Cl. .................................179/100.2 C, 340/174.1 F
[51] Int. Cl..........................................G11b 5/16, G11b 5/26
[58] Field of Search .....................179/100.2 C; 340/174.1 F; 346/74 MC

[56] References Cited

UNITED STATES PATENTS 3,529,349 9/1970 Van De Schoot et al. ......179/100.2 C
3,171,107 2/1965 Rogers............................340/174.1 F
3,167,618 1/1965 Oster et al.......................340/174.1 F

*Primary Examiner*—Bernard Konick
*Assistant Examiner*—Alfred H. Eddleman
*Attorney*—Thomas J. Nikolai, Kenneth T. Grace and John P. Dority

[57] ABSTRACT

An improved magnetic head for recording and reading information on a magnetic medium is described. The head includes a recording portion for recording information on a track having a predetermined width, and a reading portion centered on the recording portion for reading information from only a portion of the predetermined width, thereby permitting accurate recovery of information even through the reading head position over the recorded track may shift slightly prior to reading. The head also includes an improved construction for supporting the recording portion and the reading portion centered to very close tolerances with respect to one another.

9 Claims, 14 Drawing Figures

INVENTORS
MATTHIAS J. GRUNDTNER
GEORGE E. MELINK

BY Charles A. Johnson
ATTORNEY

WIDE-RECORD NARROW-READ LAMINATED MAGNETIC HEAD

BACKGROUND OF THE INVENTION

1. Field of the Invention

This invention relates to the magnetic recording and reading of information on a magnetic medium; and, more particularly, to a magnetic head device effective to record information on a track width greater than the width of a track over which the head is effective to read information from the magnetic medium.

2. Description of the Prior Art

In certain systems requiring information storage, an effective medium for storing information is a strip of magnetic coated material which is utilized in conjunction with the read/write head or heads. Such a system is illustrated in co-pending patent application of G. J. Ehalt, et al., U.S. Ser. No. 695,500, Filed Jan. 3, 1968, now U.S. Pat. No. 3,560,946, entitled Rotating-Head Memory System, and assigned to the Assignee of the present invention. In the system illustrated in that co-pending patent application, a flexible magnetic coated record member is held in a fixed position in co-operation with a rotor that supports a plurality of read/write heads. As the rotor is caused to spin, the record member is supported on a layer of air with the magnetic coating just out of contact with the surface of the rotor. Flux changes are caused in the read/write heads due to the movement of the heads past the surface of the magnetic record member. In such a system, information may be recorded and read as binary digits, referred to as bits, by a magnetic head device responsive to pulsed electrical energization to produce a magnetic field effective to magnetize certain portions of the magnetic record medium. The width of the recording portion of the head generally defines the record track width. The plurality of parallelly arranged heads results in a plurality of parallelly arranged tracks. The recording of information will be referred to alternatively as "recording" or "writing," as will the reference to the head for effecting this operation.

It has been recognized that a variety of tolerances affect the determination of the spacing required between adjacent heads. For purposes of general discussion, these tolerances can be lumped into three general groupings, namely, electrical, mechanical, and environmental. The primary electrical tolerance relating to the effect on track location is referred to as "fringing," where fringing is the ability of the write core to deposit on a magnetic medium a track of information which is somewhat wider than the actual write core width. Additionally, fringing can be considered as the ability of the read core to sense a magnetic track of information even though the closest edge of the read core may not be directly over a portion of the magnetized track. In the latter situation, it can be seen that if a read core is permitted to get too close to the next adjacent recorded track, erroneous information will be sensed as noise. Further, if a write core is too wide, the application of write current thereto will partially obliterate the next adjacent tracks, thereby effectively narrowing the width of such tracks. Narrowing of the next adjacent tracks lowers the reliability of the memory system in recovering recorded data.

The location of the read/write heads is also affected by mechanical tolerances, which are determined by existing machining and measurement practices. These of course include the tolerances in the support for the read/write heads, including the bearings, and the mechanical tolerances of the record members.

The environmental tolerances include temperature and humidity considerations. For those systems where the read/write heads are mounted in a rotor, for co-operation with a flexible magnetic record member, it will be seen that the base material of the flexible record member will have a different coefficient of expansion with regard to temperature changes, than that experienced in the read/write heads and the supporting rotor. Further, these differences will be accentuated where attempts are made to read relatively warm record members in a cold record member system, and where it is attempted to read relatively cold record members in a warm operating record member system. Further, it will be noted that the base material of the flexible record member will often respond differently to changes in humidity than will the read/write heads and the supporting mechanisms.

In view of the foregoing described tolerance situations, it has been found difficult to maintain an exact lateral alignment of the read/write heads with respect to the recording tracks on the magnetic medium. For equal widths of recorded track on the recording medium, a lateral missalignment of the read/write heads with respect to the recording medium, due to the effects of any of the foregoing mentioned tolerances, will result in reduction of the track width of adjacent tracks during the recording operation, and reduction in the read-out signal during the reading operation.

It has been recognized in the prior art, that this problem can be attacked by recording over a track width wider than will be read during reading operations. Various read/write head structures have been devices for accomplishing such a wide-record and narrow-read operation. Various problems in the prior art read/write heads of this type have been encountered, wherein a major problem exists in maintaining a close control of the alignment of the read head with the write head. It was common in the prior art, to provide a common gap for both reading and writing. In such an arrangement, it was characteristic for the read core portion to be effective magnetically over a narrower width than that of the write core. However, since a common gap was utilized, it was characteristic for there to be additional fringing outwardly during the reading operation.

SUMMARY

By use of a center magnetically isolated core portion having a recording portion of the first width and a reading portion of a second narrower width, in conjunction with separated read and write gaps, and in co-operation with a write core half matching the width of the write gap and a narrower read core half in cooperation with the read gap, the problem of fringing is virtually eliminated. The addition of a support member for all of the read/write head elements results in a plane of reference that assures center-line alignment of the write head and the read head.

It is therefore, a principal object of this invention to provide an improved read/write magnetic head effective to record information on a magnetic medium over a wider track than will be read by the reading head during reading operations. Yet another object of this invention is to provide an improved read/write head wherein the write head and read heads are aligned along their center lines to a very close tolerance. Still another object of this invention is to provide an improved read/write head having a write gap separated from a read gap, the effective width of the read gap being less than the effective width of the write gap.

BRIEF DESCRIPTION OF THE DRAWINGS

The foregoing general objectives, and more specific objectives, will become apparent from a consideration of the detailed description of the preferred embodiment, when viewed in light of the drawings, in which.

DESCRIPTION OF THE PREFERRED EMBODIMENT

Figure 1:
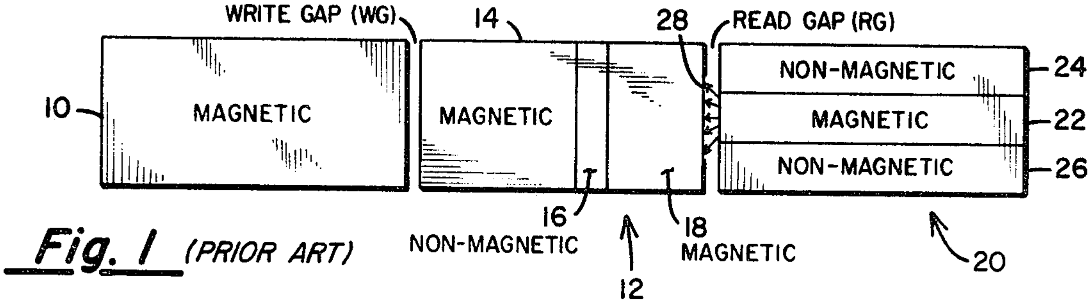
Fig. 1 (PRIOR ART)
FIG. 1 illustrates one type of prior art recording head format in which the write gap is separate from the read gap, but in which the center leg of the read core is of the same width as the write core.

In FIG. 1 there is shown a characteristic face view of a prior art read/write head that was intended for recording at a first width, and reading from a narrower width. This configuration incorporates a first block of magnetic material 10, referred to as a write core, and separated by the write gap (WG) from a portion of an intermediate member 12. The intermediate member, referred to as the I core, includes a magnetic portion 14 of the same width as the write core 10. A non-magnetic portion 16 is positioned intermediate the magnetic portion 14 and second magnetic portion 18. The read core portion 20 is comprised of a center magnetic portion 22 bounded by non-magnetic portions 24 and 26. The read core 20 is separated from the I core by the read gap (RG). The operational problem associated with a read/write head of this type is illustrated in the arrows 28, illustrating flux paths, in the read gap. It can be seen that substantial fringing results in that the magnetic 18 is the full width of the read/write head, whereas the magnetic portion 22 of the read core is substantially narrower.

Figure 2:
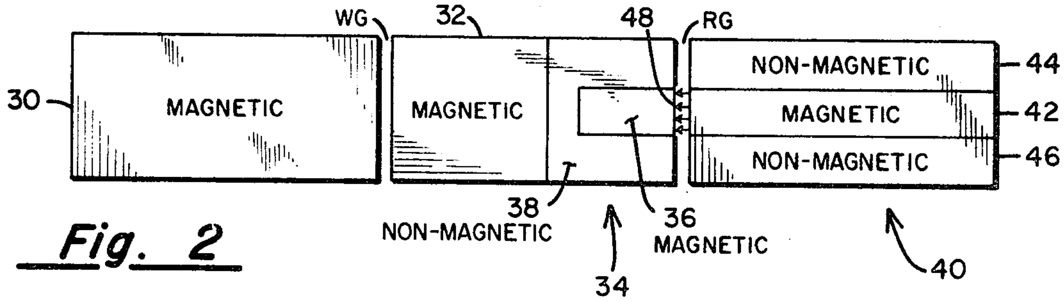
FIG. 2 is the format of the pole faces of the read/write head of this invention.

In FIG. 2 there is illustrated an arrangement for a read/write head that overcomes the fringing problem in the prior art. In this diagram, a write core 30 is associated with a magnetic portion 32 in the I core section 34. The write gap (WG) extends the full width of the write core 30. This provides a relatively wide pole face for the write gap. The read portion of the I core 34 is comprised of a magnetic portion 36 and a non-magnetic portion 38. Again, the read core portion 40 is comprised of a magnetic core 42 and pair of non-magnetic members 44 and 46. The arrangement is such that at the pole face, the width of the read core magnetic portion 42 is substantially equal to the width of the magnetic portion 36 in the I core. In this arrangement, arrows 48 in the read gap (RG) pass directly across the read gap with little or no fringing. In this diagrammatic view, it can be seen that the read gap provides a generally more narrow pole face than that of the pole face at the write gap. Further, the ideal condition is illustrated with the center line of the write core 30, the I core 34, and the read core 40 being exactly aligned. This exact center line alignment results in the optimum arrangement for providing maximum tolerance for adjacent tracks. The structure for maintaining this center line alignment will be described in more detail below.

It should be understood that the structure of the read/write head of this invention is made by a series of laminations, with 31 layers being utilized in the write core 30 and 7 laminations being utilized in read core 42. Each laminate is 0.5 mils in thickness. At the pole faces, there are 31 laminations in the write portion 32 of the I core, together with 7 laminations exposed in the magnetic portion 36 of the I core.

Materials that can be utilized in the read/write head having the face format as illustrated in FIG. 2, will include a molypermalloy alloy identified as HiMu–80, an alloy of 17 percent iron, 79 percent nickel, and 4 percent Molybdenum, available from Carpenter Steel Company, or its equivalent for the magnetic portions, together with a potting material for the non-magnetic portion 38 of the I core 34, and beryllium copper laminations for non-magnetic portions 44 and 46.

Figure 3:
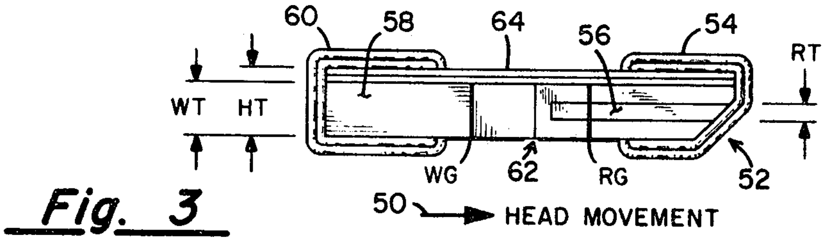
FIG. 3 is a top view of the preferred embodiment of the read/write head of this invention.

FIG. 3 is a top view of the preferred embodiment of the read/write head of this invention. In this arrangement, the head movement with respect to the magnetic recording medium is in the direction of arrow 50. This relative movement can be achieved by moving the head in the direction of arrow 50 while maintaining the magnetic medium relatively stationary, or by holding the magnetic read/write head relatively stationary and moving the magnetic medium in a direction opposite to that of arrow 50. In either event, the read core portion 52 is the leading portion of the read/write head. A read coil 54, comprised of 36 turns of 45 gauge Bifilar wire is wound on the read core 52. Bifilar wire is a two-stranded wire. It will be noted that the leading edge of the read core 52 is beveled. This beveling results in a reduction of undesirable leading-edge signal that would otherwise affect the operation of the read core 52. The magnetic portion 56 of the read core 52 has a reading thickness RT. The write core 58 has a write winding 60 comprised of 10 turns of 40 gauge Bifilar wire wrapped thereon. The thickness of the write core 58 is designated WT, while the thickness of the entire head is comprised of HT. The read core 52, the write core 58, and the I core 62 are mounted to support member 64 for holding their center line alignment within a tolerance of 0.00025 inch.

Figure 4:
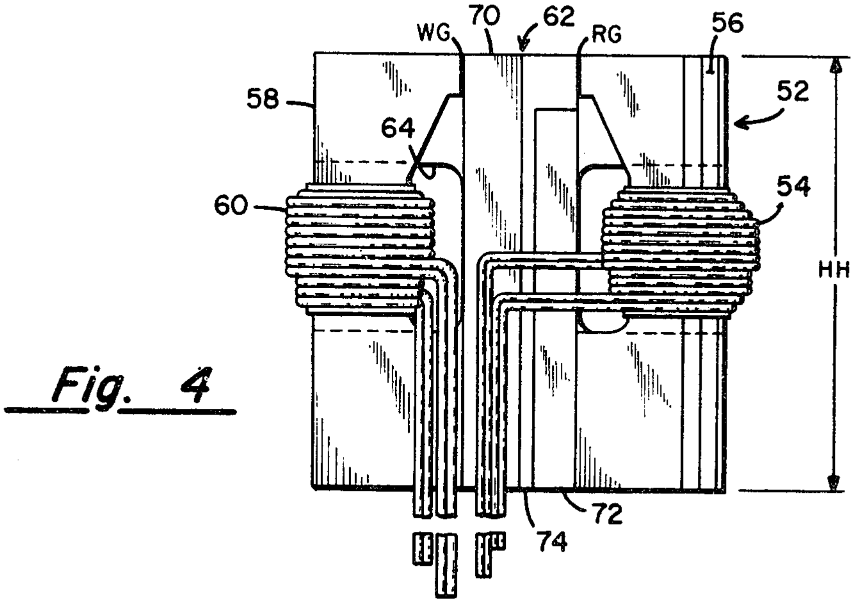
FIG. 4 is a front view of the read/write illustrated in FIG. 3.

FIG. 4 is a Front view of the read/write head illustrated in FIG. 3. Elements will bear the same reference numerals as previously applied with regard to FIG. 3. In this Front view, it can be seen that the I core 62 has a left-hand portion, or write portion 70. The write portion 70 is in contact with the lower portion of the write core 58. The I core 62 also has a right-hand portion or read portion 72, with the lower portion of the read portion 72 in contact with the read core 52. The non-magnetic material 74 isolates the write portion 70 from the read portion 72 of the I core 62. The entire assembly is mounted to support member 64, with support member 64 including a center support portion generally of a width of I core 62, and a pair of generally parallel top and bottom support portions for bonding to the upper and lower portions of the write core 58 and the read core 52. The arrangement is such that the write winding 60 and the reading winding 54 do not interfere with the support member 64. The shape of support member 64 is illustrated in more detail in FIGS. 8*a* and 8*b*, and will be described more fully below.

Figure 5A:
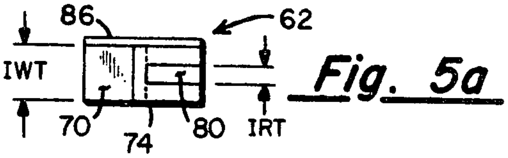
FIGS. 5*a*, 5*b*, and 5*c* are top, side, and end views respectively, of the center portion of the read/write head of this invention.
Figures 5B, 5C:
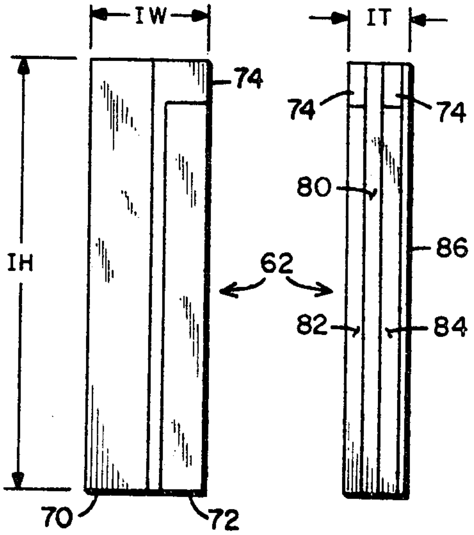

In FIGS. 5*a*, 5*b*, and 5*c* there is shown respectively, top, side, and end views of the I core 62 of this invention. The I core 62 forms a part of both the write head and the read head. It includes the write portion 70, having a width IWT, and an effective read portion 80 having a width of IRT. Both the write portion 70 and the read portion 80 are comprised of magnetic material as described above. The non-magnetic material 74 separates the write portion 70 from the read portion 72. The I core has a height of IH, a width of IW, and a thickness of IT. The read portion 80 has a magnetic member 82 on one side thereof and a magnetic member 84 on the other side thereof, and it being illustrated in FIG. 5*c* that such members do not extend the full height IH. The entire I core 62 is formed on a beryllium copper backing piece 86.

Figures 6A, 6B:
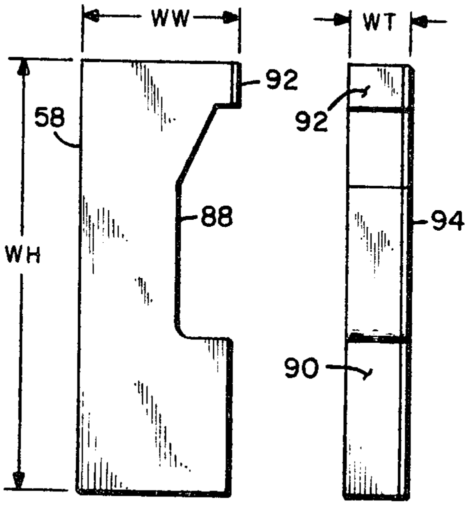
FIGS. 6*a*, and 6*b* are side and end views, respectively, of the write core of the read/write head of this invention.

FIG. 6*a* is a side view of the write core 58, and FIG. 6*b* is an end view of the write core. The write core 58 has a height WH, a width WW, and a thickness WT. It also includes a narrowered portion 88 upon which the write winding 60 is wound. The lower surface 90 is arranged to physically contact an adjacent portion of the write portion 70 of the I core. At the upper extremity, a coating 92 of copper is placed on the write core 58. The thickness of this coating is in the order of 500 micro inches, and operates to define the width of the write gap WG. This coating of copper 92 is arranged for contacting the upper surface of the write portion 70 of the I core. The laminations that comprise the write core 58 are backed by a beryllium copper backing member 94.

Figure 7A:
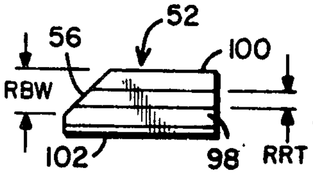
FIGS. 7*a*, 7*b*, and 7*c* are top, side, and end views, respectively, of the read core portion of the read/write head of this invention.
Figures 7B, 7C:
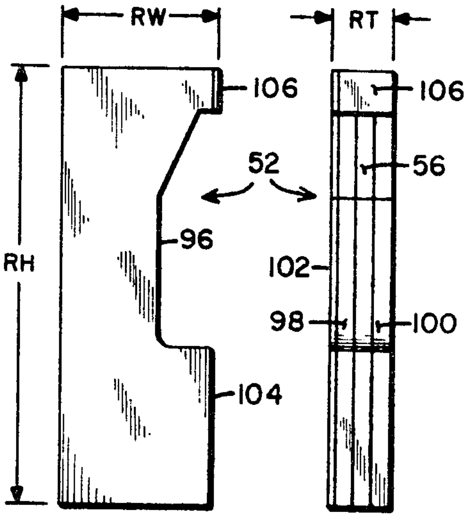

FIGS. 7*a*, 7*b*, and 7*c* are top, side, and end views, respectively, of a read core 52. The read core 52 has a height RH, a width RW and a thickness RT. The thickness of the magnetic portion 56 is RRT, and the width of the beveled portion is RBW. The read core 52 has a relatively narrow portion 96 upon which the read coil 54 is wound. The magnetic portion 56 is bounded by a non-magnetic member 98 on one side, a non-magnetic member 100 on the other side. A backing member of beryllium copper 102 is applied to the entire surface of the read core 52. The non-magnetic members 98 and 100 are also comprised of laminations of beryllium copper.

The lower surface 104 is arranged for contacting a portion 72 of the I core 62. A coating of copper 106 is placed on the upper portion of the read core 52, to a thickness of approximately 200 micro inches. This thickness of copper defines the read gap and contacts the upper portion of 72 of the I core 62.

Figures 8A, 8B:
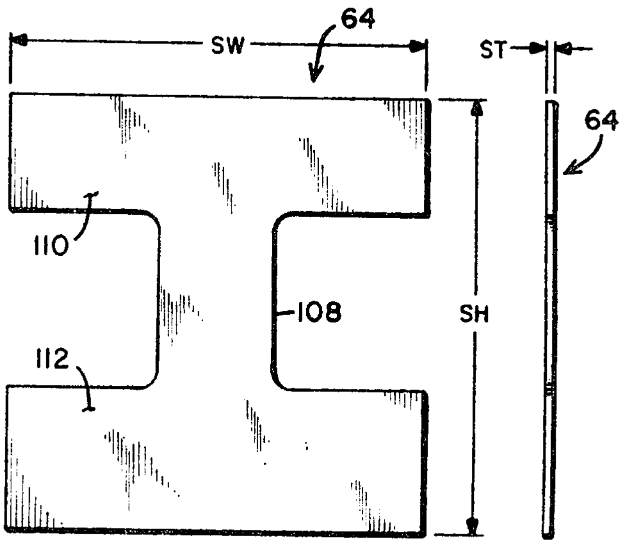
FIGS. 8*a* and 8*b* are side and end views, respectively, of the support member utilized for supporting the center portion, the read core portion, and the write core portion in a predetermined aligned relationship.

FIGS. 8*a* and 8*b* are side and end views, respectively, of the support member 64. This support member is alternatively called the side shim. The support member has a width SW, a height SH, and a thickness ST. The center narrow portion 108 is approximately of a width equal to that of the I core 62. The upper support portion 110 and the lower support portion 112 extend generally parallel to each other and are surface to which the read core 52 and the write core 58 can be bonded. The I core 62 is bonded to the entire center portion of the support member 64. The arrangement is such that the beryllium copper backings, 86 for the I core, 94 for the write core, and 102 for the read core, are placed in contact with the surface of the support member 64 and bonded thereto. The support member 64 is also constructed of a sheet of beryllium copper.

Read/write heads in accordance with this invention have been constructed, and found to perform the various stated purposes and objectives of the invention, with the characteristic dimensions illustrated in Table I.

TABLE I

| Dimensions | | |
|---|---|---|
| I. Head | | |
| HH = 0.180 in. | HT = 0.0222 in. | HW = 0.165 in. |
| WG = 500 micro in. | | |
| RG = 200 micro in. | | |
| II. Write Core | | |
| WH = 0.180 in. | WT = 0.0210 in. | WW = 0.060 in. |
| III. Read Core | | |
| RH = 0.180 in. | RT = 0.0210 in. | RW = 0.060 in. |
| RBW = 0.015 in. | RRT = .0045 in. | |
| IV. I Core | | |
| IH = 0.180 in. | IRT = .0045 in. | IW = 0.045 in. |
| | IT = 0.0210 in. | |
| | IWT = 0.0210 in. | |
| V. Support | | |
| SH = 0.178 in. | ST = 0.001 in. | SW = 0.162 in. |

In order to achieve the very small sizes required for the read/write heads of this invention, the laminations are formed in sheets of the respective types of materials by chemical etching processes, or other well known types of manufacturing processes. With a plurality of the various types of laminations formed in each of the sheets, the appropriate number of such sheets are stacked and bonded together. For example, the write core has 31 sheets of the magnetic material, plus one sheet of beryllium copper (backing layer) with the shapes of the write cores formed therein, stacked and bonded together. The bonding is by well known applications of adhesives to the appropriate layers, followed by bringing the layers into proper alignment and causing the adhesives to cure. Once the sheets have been bonded together and a plurality of the various types of cores thereby made, the individual cores are sheared from the sheet and lapped. The gap material is deposited on the top pole face and the windings placed thereon. The same procedure is followed for the I cores with the shape etched in each of the sheets depending upon whether it is the magnetic reading portion or the magnetic adjacent portion. The same procedure is followed for the read core, with the various layer shapes being formed, stacked and bonded. The read cores are sheared and lapped and the gap material is deposited on the top pole face and the read windings placed thereon.

The support members are also formed from sheet material, with a plurality of the support members being formed in a single sheet. The forming can be by way of chemical etching, or by stamping procedures, or by other well known manufacturing procedures.

When the full complement of components is available, the individual read/write heads are formed. This formation is accomplished by holding the support member in an appropriate manufacturing jig, and placing the write core with its associated write winding on the support member. The I core is placed in the middle of the support member, and the read core with its associated read winding is placed on the remainder of the support member. An adhesive is applied between the components and the support member, with the entire assembly being placed in a compression fixture and cured thereby causing the beryllium backing material from each of the components to be adhered to the support member.

Once a plurality of such read/write heads is so formed, they are assembled into the appropriate supporting mechanism, for instance the rotor or multichannel head assemblies, and are coupled to the reading and writing circuitry.

In operation of the read/write head of this invention, the write winding 60 is energized by the application of current from a source (not shown) as the magnetic medium (not shown) is caused to have motion relative to the head. The intensity of the energization is great enough to magnetically record on the magnetic record medium. That is, the magnetomotive force is applied as required to pass the amount of flux which the magnetic member can accommodate for recording. The nature of the magnetic field will then determine what kind of information is stored on the magnetic medium.

For reading information, the write winding is not utilized. The relative movements between the read/write head and the record medium causes the flux of a premagnetized portion of the medium encountered by the read gap to link the read core, thereby causing a time-rate-of-change of flux in the magnetic portion 56. This induces a potential in the read winding 54. The non-magnetic material at both sides of the magnetic portion 56 operates to minimize the effect of any magnetization that may fall thereunder. Further, the magnetic portion of the I core provides a magnetic width of member 80 co-extensive with the width of the magnetic portion 56 of the read core 52. As a consequence, the head 52 is effective to read magnetically recorded information along only the width of the read gap in the portion between members 56 and 80.

From the foregoing detailed description of the preferred embodiment, it can be seen that the various objectives and purposes of the invention have been achieved. It being understood that various changes, and modifications, will become apparent to those skilled in the art, upon consideration of the drawings and description herein, without departing from the spirit and scope of the invention, what is intended to be protected by Letters Patent is set forth in the appended claims.

We claim:

1. A magnetic reading and recording head comprising: magnetic recording means having a non-magnetic recording gap of a first width, said recording gap arranged transverse to the direction of relative motion between said magnetic recording means and an associated magnetic record member, said recording gap generally defining a track of magnetically recorded information with said track being substantially equal to said first width; magnetic reading means having a non-magnetic reading gap of a second width, said second width being narrower than said first width, and said reading gap being displaced from said recording gap in the direction of said relative motion, and generally parallel to said recording gap for reading only a portion of said track of magnetically recorded information; non-magnetic isolation means intermediate said magnetic recording means and reading means for isolating said recording and reading means from each other, and non-magnetic support means for supporting said magnetic recording means, said magnetic reading means and said non-magnetic isolation means in a predetermined aligned relationship; said magnetic recording means further comprising a recording core portion comprised of a first plurality of laminated layers of magnetic material, said recording core portion having a recording pole face portion of said first width and a first magnetic contact portion; recording conductor means wound on said recording core portion for receiving electrical energization for causing magnetic recording at said recording gap, intermediate core recording leg means comprised of a like first plurality of laminated layers of magnetic material; said recording leg means having a recording pole face portion substantially equal to said first width and a magnetic surface in contact with said first magnetic contact portion; and non-magnetic recording gap means intermediate said recording pole face portions, the thickness of said non-magnetic recording gap means defining the recording gap for said magnetic recording means.

2. The magnetic reading and recording heads as in claim 1 wherein said magnetic reading means includes a reading core portion comprised of a second plurality of laminations of magnetic material, said second plurality being less than said first plurality of having first and second outer surfaces, first and second non-magnetic means substantially co-extensive with and bonded respectively to said first and second surfaces of said second plurality of laminations of magnetic material, said reading core portion having a reading pole face of said second width and a second magnetic contact portion; reading conductor means wound on said reading core portion for sensing induce time-rate-of-change signals from the recorded magnetic record member; intermediate core reading leg means comprised of a like second plurality of laminated layers of magnetic material and having third and fourth surfaces, third and fourth non-magnetic means bonded respectively to said third and fourth surfaces for preventing magnetic fringing during reading, said layers of magnetic material of said reading leg means having a reading pole face portion substantially equal to said second width and a magnetic surface in contact with said second magnetic contact portion; and non-magnetic read gap means intermediate said reading pole face portions, the thickness of said non-magnetic reading gap means defining the reading gap for said magnetic reading means.

3. The reading and recording head as in claim 2 wherein said non-magnetic isolation means is integrally formed with said intermediate core recording leg means and said intermediate core reading leg means.

4. A magnetic reading and writing head including laminated magnetic write core means having a write pole face of a first width and a first magnetic contact surface; write conductor means wound on said write core means for receiving electrical energization for causing magnetic writing; laminated read core means including a magnetic reading portion having first and second surfaces and with a reading pole face of a second width narrower than said first width, and first and second non-magnetic members bonded respectively to said first and second surfaces, the total combined width of said first and second and said second width being substantially equal to said first width, said read core means including a second magnetic contact surface; read conductor means wound on said read core means for sensing time-rate-of-change signals from a recorded magnetic member; intermediate core means including a magnetic writing portion of said first width in contact with said first magnetic contact surface for cooperating with said write core means, a magnetic reading portion of said second width in contact with said second magnetic contact surface for cooperating with said read core means, and non-magnetic means intermediate said writing portion and said reading portion for isolating said writing portion and said reading portion from each other; non-magnetic write gap means intermediate said magnetic write core means and said writing portion for defining the write gap at said write pole face; and non-magnetic read gap means intermediate said read core means and said reading portion for defining the read gap at said head pole face, the arrangement causing said read gap to sense only a portion of the track substantially equal to said second width after a track substantially equal in width to said first width has been recorded.

5. The magnetic reading and writing head as in claim 4 and further including non-magnetic support means for mounting said magnetic write core means, said read core means, and said intermediate core means in a predetermined aligned relationship with said write gap generally parallel to and spaced apart from said read gap, said write gap and said read gap being transverse to the direction of relative motion between the reading and writing head and a record member.

6. The magnetic reading and writing head as in claim 5 wherein said intermediate core means further includes third and fourth magnetic means respectively bonded to the opposite sides of said magnetic reading portion; said third and fourth means of a shorted height than said laminated read core means and not in contact the read core pole face for minimizing the effects of magnetic fringing during reading, and limiting reading to said second width.

7. The magnetic reading and writing head as in claim 6 wherein said write core means, said read core means, and said intermediate core means each include non-magnetic backer means on one surface thereof, said backer means each being positioned next adjacent to said non-magnetic support means and bonded thereto.

8. The magnetic reading and recording as in claim 7 wherein said non-magnetic support means includes a center portion for supporting said intermediate core means, a first pair of spaced apart portions coupled to one edge of said center portion for supporting upper and lower parts of said write core means, and a second pair of spaced portions coupled to another edge of said center portion for supporting said upper and lower parts of said read core means, said center portion and said first and second pairs of spaced apart portions being substantially planar for holding said intermediate core means, said write core means, and said read core means in a closely aligned relationship.

9. A magnetic reading and recording head comprising: magnetic recording means having a non-magnetic recording gap of a first width, said recording gap arranged transverse to the direction of relative motion between said magnetic recording means and an associated magnetic record member, said recording gap generally defining a track of magnetically recorded information with said track being substantially equal to said first width; magnetic reading means having a non-magnetic reading gap of a second width, said second width being narrower than said first width, and said reading gap being displaced from said recording gap in the direction of said relative motion, and generally parallel to said recording gap for reading only a portion of said track of magnetically recorded information; non-magnetic isolation means intermediate said magnetic recording means and reading means for isolating said recording and reading means from each other, and non-magnetic support means for supporting said magnetic recording means, said magnetic reading means and said non-magnetic isolation means in a predetermined aligned relationship with the center of said second gap being substantially aligned with the center of said first gap along the direction of said relative motion.

* * * * *

UNITED STATES PATENT OFFICE
CERTIFICATE OF CORRECTION

Patent No. 3,662,122 Dated May 9, 1972

Inventor(s) Matthias J. Grundtner et al.

It is certified that error appears in the above-identified patent and that said Letters Patent are hereby corrected as shown below:

Claim 1, column 7, line 3, after the word "gap change "," to -- ; --.

Claim 4, column 7, line 51, after the word "second" and before the word "and" insert -- non-magnetic members --.

Signed and sealed this 19th day of March 1974.

(SEAL)
Attest:

EDWARD M. FLETCHER, JR.
Attesting Officer

C. MARSHALL DANN
Commissioner of Patents